UNITED STATES PATENT OFFICE.

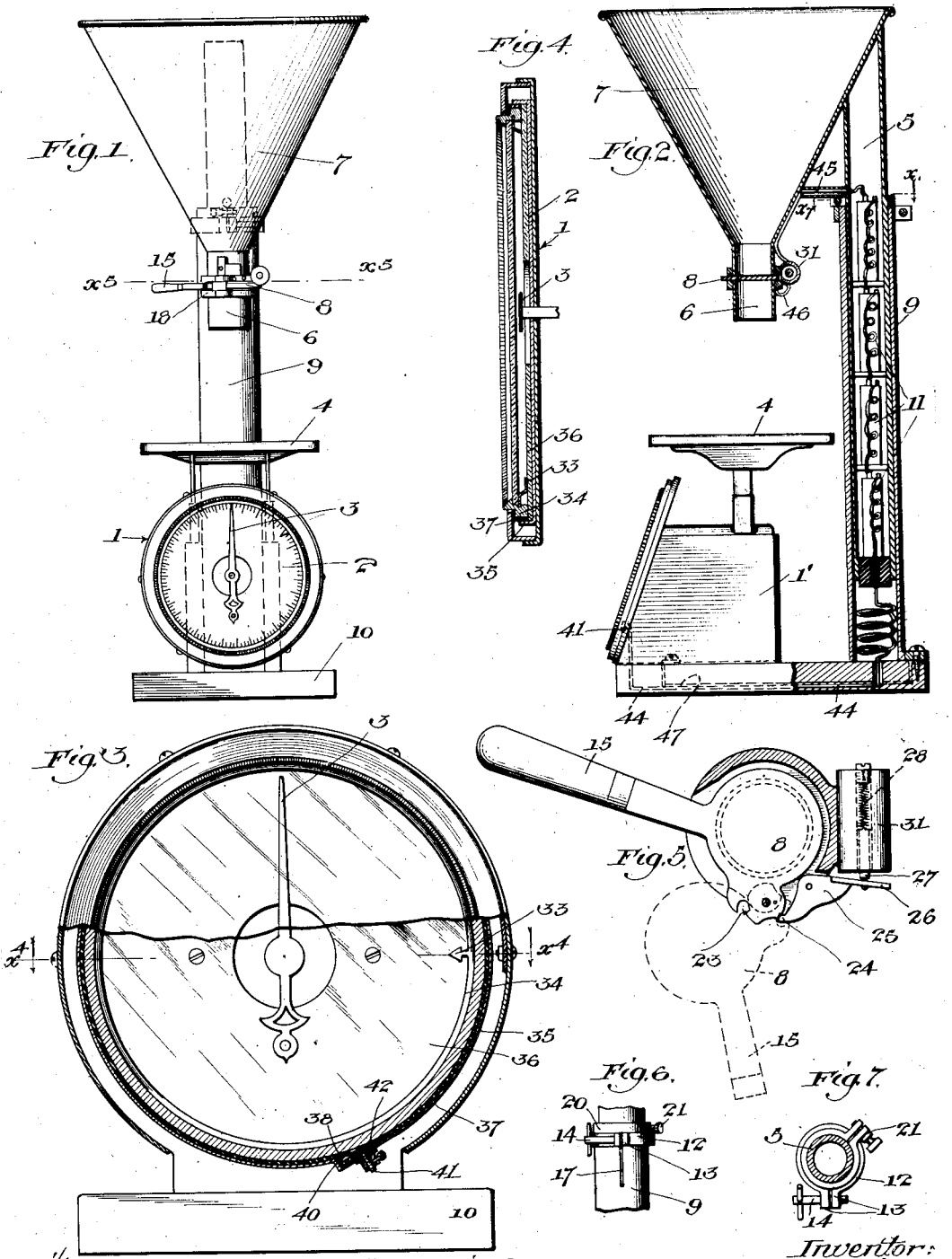

JOSIAH GRIMES, OF LOS ANGELES, CALIFORNIA, ASSIGNOR OF ONE-HALF TO BIRD F. LYTTLE, OF LOS ANGELES, CALIFORNIA.

AUTOMATIC WEIGHING DEVICE.

1,079,407.  Specification of Letters Patent.  Patented Nov. 25, 1913.

Application filed January 9, 1913.  Serial No. 741,110.

*To all whom it may concern:*

Be it known that I, JOSIAH GRIMES, a citizen of the United States, residing at Los Angeles, in the county of Los Angeles and State of California, have invented a new and useful Automatic Weighing Device, of which the following is a specification.

This invention relates to a scales for weighing out automatically, predetermined portions of goods, for example, sugar, rice, etc., and the main object of the present invention is to provide a device for this purpose, of simple construction and accurate in operation.

A further object of the invention is to provide convenient means for adjusting or predetermining the amount of material to be weighed.

The invention is particularly intended for use in connection with direct reading scales in which the weight is indicated on a dial or graduated scale by relative movement directly operated by the weight in contradistinction to even balance scales wherein a weight has to be shifted to bring the scale to an even balance.

This invention is, therefore, applicable in connection with spring scales or weighted scales of the dial or the computing scale type and an important object of the present invention is to provide means for automatically cutting off the supply of material by means under control of the aforesaid relatively moving parts so as to stop the supply when the proper weight has been delivered and to provide for adjustment of the controlling means to regulate the point at which the cut-off means shall operate so as to vary the amount delivered as required.

Other objects of the invention will appear hereinafter.

The accompanying drawings illustrate an embodiment of the invention, and referring thereto: Figure 1 is a front elevation of the device. Fig. 2 is a vertical section thereof, with the scales in elevation. Fig. 3 is a front elevation of the scale partly broken away. Fig. 4 is a horizontal section on line $x^4$—$x^4$ in Fig. 3. Fig. 5 is a horizontal section on line $x^5$—$x^5$ in Fig. 1. Fig. 6 is a partial elevation, showing the clamp for the supporting standard. Fig. 7 is a section on line $x^7$—$x^7$ in Fig. 2. Fig. 8 is a vertical section of the pivot for the shut off gate or valve.

1 designates a direct reading weighing scales which may be of any usual or suitable construction, said scales being provided with a case or frame 1', dial 2, pointer or indicating member 3, pivoted to move over said dial to indicate the amount weighed, and a platform 4 connected to operate the pointer in response to the weight on the scales, in the usual manner. It will be understood that this scales is provided with the usual counterbalance spring or weight to sustain the weight to be weighed.

A feed means for supplying the material to be weighed is provided above the platform 4, said feed means comprising, for example, a hopper or funnel 7 provided with a spout 6 and a gate 8 for closing and opening said spout. Said hopper or funnel is preferably adjustable vertically to adapt the device for use with different bags or packages. For this purpose said hopper or funnel is carried by a standard or post 5 which telescopes or slides vertically within a tubular standard or post 9, mounted on the base 10 for the spring scales. In order to clamp the inner member 5 into any desired vertical position, the outer tubular member is formed at its upper end with a clamping means consisting, for example, of a split ring or collar 12 having projections or lugs 13 to receive a clamp screw 14 bearing against one of said lugs and screwing in the other lug to compress the said split ring against the inner member 5, the upper portion of said outer tubular member 9 being split as at 17 to permit the spring ring to move elastically in this clamping operation. A split collar or ring 20 may also be provided for supporting the inner member 5 while permitting rotation thereof, said split collar 20 being provided with a clamp screw 21 for clamping it firmly on the inner member 5, it being movable vertically on said inner member when said clamp screw is released. The inner member 5 is also preferably tubular and is utilized as a means for holding the battery 11.

Gate 8 is pivotally mounted on a collar 18 on the spout 6, and is provided with a handle 15 for moving it to open position and a spring 16 for moving it to position to close the spout 6, said spring being attached at one end to the gate 8 and at the other end to a plug 19 adjustably secured by a set screw 19' in a housing 22 on spout 6. A shoulder or projection 23 on said gate 8 is engaged by a trip device or detent consisting of a hook 24 on an armature lever 25 carrying an armature 26 which is connected to core 27 of a solenoid or electromagnetic device 31 carried by the collar 18. A spring 28 operates on armature core 25 to hold the detent 24, in engagement with shoulder 23.

Solenoid 31 is connected in electric circuit with a circuit controlling device controlled by the movement of the pointer 3 of the scales, said pointer 3 being adapted to make contact with a metallic finger or contact member 33 carried by a metal ring 34 which is mounted within a circular flange 35 on the front or dial of the spring scale. A glass plate 36 is placed in front of the graduated dial 2 and metallic ring 34 rests against said glass plate and is insulated from the circular flange 35 by an annular insulating member 37 consisting, for example of a strip of hard fiber. The circular flange 35 is bent out to form a recess 38 for receiving a contact spring 40 carried by a screw 41 which is mounted in insulating bushing 42 on the circular flange 35, said spring being adapted to make contact with the metal ring 34, said ring being mounted by the above described means so as to be rotatable to move the contact member 33 thereon to different angular positions around the scale or dial, and to maintain its connection with the metal screw 41 at all times. As shown in Fig. 2, said metal screw 41 is connected by wire 44 to one side of the battery indicated at 11, the other side of said battery being connected by wire 45 to one end of the winding of the solenoid 31, the other end of said winding being connected by wire 46 to the metal funnel 7 which is in conductive connection through the telescoping tubular post 5, 9 with a wire 47 leading to the case or metal frame 1' of the spring scale, in conductive relation with the pointer 3.

The operation is as follows: The funnel 7 is set at the proper height to admit of the bag or package to be filled being placed on the platform beneath the spout 6, gate 8 being closed after the funnel 7 is filled or charged with sugar or other material to be weighed, and the metal ring 34 is turned into a position to bring the contact 33 opposite the mark on the dial or scale 2 corresponding to the weight to be measured or weighed out. Gate 8 is then moved into open position by means of its handle 15 and is caught and retained in said position by engagement of the detent 24 with the shoulder 23 on said gate, said detent being held in engagement with said shoulder by the spring 28. As soon as the gate 8 is opened in this manner the material within the funnel begins to run out through the spout 6 into the bag or receptacle on the platform and when the desired weight of material has passed into the bag in this manner, the platform is depressed sufficiently thereby to turn the pointer 3 so as to bring it into contact with the contact finger 33 on the ring 34, thus establishing a circuit from battery 11 to wire 44, to metal screw 41, contact spring 40, metal ring 34, contact 33, pointer 3, metal frame 1', wire 47, tubular post 9, 5, wire 50, winding of solenoid 31 and wire 45, to the other side of the battery. The current passing in this circuit energizes the solenoid and causes the armature and core thereof to be attracted and the armature 35 to be moved to release the detent 34 thereon from the shoulder 23, allowing the spring 16 to move the gate to closed position, this action being practically instantaneous, so that the supply of material has been shut off as soon as the proper weight has been reached. In case it is desired to use the scale 1 as an ordinary weighing scale, the clamp screw 14 may be loosened and the funnel swung around out of the way, the inner member 5 turning within the outer member 9, and being supported by the collar 20, said collar being clamped by a screw 21 onto the inner member 5. Whenever it is desired to change the height of the funnel the clamp screws 14 and 21 are loosened, the inner member moved up or down as required in the outer member and the ring 20 slid on the inner member so as to bring it into contact with the top of the outer member 9 and said clamp screws are then tightened.

What I claim is:

1. An automatic weighing scales comprising a direct reading scales provided with pivoted indicator, an adjustable contact in the path of said indicator, a feed gate for said scales, electromagnetic means for controlling said feed gate, and an operating circuit therefor including said indicator and said adjustable contact and also including a traveling contact means comprising a contact ring member and a contact member therefor, said members of the traveling contact means being mounted to permit of relative movement thereof around the pivot of the indicator, and one of said members of the traveling contact means being connected to said adjustable contact.

2. An automatic weighing scales comprising a direct reading scales provided with a dial and with a pointer, a rotatable metal ring around said dial, a contact member carried by said ring and movable therewith to different positions in the path of said pointer, an electromagnetically controlled feed gate for said scales, and a controlling circuit therefor, including a source of current and connected to said pointer and to said metal ring so as to operate said feed gate when the pointer touches said contact member.

In testimony whereof, I have hereunto set my hand at Los Angeles, California, this 2nd day of January, 1913.

JOSIAH GRIMES.

In presence of—
ARTHUR P. KNIGHT,
MARTHA M. LANGE.